US012206789B2

(12) United States Patent
Ladd et al.

(10) Patent No.: US 12,206,789 B2
(45) Date of Patent: Jan. 21, 2025

(54) USING A ZERO-KNOWLEDGE PROOF TO PROVE KNOWLEDGE THAT A WEBSITE VISITOR IS A LEGITIMATE HUMAN USER

(71) Applicant: CLOUDFLARE, INC., San Francisco, CA (US)

(72) Inventors: Watson Bernard Ladd, Berkeley, CA (US); Alexander Andrew Davidson, Lisbon (PT); Marwan Fayed, St Andrews (GB); Armando Faz Hernández, San Francisco, CA (US); Sai Krishna Deepak Maram, New York, NY (US); Nicholas Thomas Sullivan, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 509 days.

(21) Appl. No.: 17/217,703

(22) Filed: Mar. 30, 2021

(65) Prior Publication Data

US 2022/0321354 A1 Oct. 6, 2022

(51) Int. Cl.
*H04L 9/32* (2006.01)
*G06F 21/32* (2013.01)
*H04L 9/14* (2006.01)

(52) U.S. Cl.
CPC ............ *H04L 9/3247* (2013.01); *G06F 21/32* (2013.01); *H04L 9/14* (2013.01)

(58) Field of Classification Search
None
See application file for complete search history.

(56) References Cited

U.S. PATENT DOCUMENTS 3,723,005 A * 3/1973 Smith .................... G02B 23/00 356/139.08
8,656,486 B2 2/2014 Hicks et al.
9,723,005 B1 * 8/2017 McInerny ............. G06F 21/604
9,877,193 B2 1/2018 Yang et al.
(Continued)

OTHER PUBLICATIONS

Yampolskiy, R.V., 2012. AI-Complete CAPTCHAs as Zero Knowledge Proofs of Access to an Artificially Intelligent System. International Scholarly Research Notices, 2012(1), p. 271878. (Year: 2012).*
(Continued)

*Primary Examiner* — Luu T Pham
*Assistant Examiner* — Edward X Long
(74) *Attorney, Agent, or Firm* — NICHOLSON DE VOS WEBSTER & ELLIOTT LLP

(57) ABSTRACT

A client device receives a challenge request from a server to prove that internet traffic was initiated by a human user through verifying a physical interaction between a human user and a hardware component. The client device causes a prompt to be displayed to perform the physical interaction with the hardware component. A cryptographic attestation is received that includes an attestation signature that is generated after confirmation that the physical interaction was performed with the hardware component. A zero-knowledge proof of the attestation signature is generated and transmitted to the server for verification. The client device receives the requested content responsive to the server verifying the validity of the zero-knowledge proof.

26 Claims, 11 Drawing Sheets

(56) References Cited

U.S. PATENT DOCUMENTS

| | | | | |
|---|---|---|---|---|
| 11,368,307 | B1 * | 6/2022 | Ozarkar | H04L 9/3218 |
| 2009/0138711 | A1 * | 5/2009 | Heimbigner | H04L 51/212<br>713/176 |
| 2015/0213251 | A1 * | 7/2015 | Turgeman | H04W 12/06<br>726/7 |
| 2022/0021537 | A1 * | 1/2022 | Wagner | H04L 9/3213 |
| 2022/0263861 | A1 * | 8/2022 | Marozas | G06F 21/552 |
| 2023/0073437 | A1 * | 3/2023 | Wang | G06F 21/52 |

OTHER PUBLICATIONS

Nayeem, M.T., Akand, M.M.R., Sakib, N. and Kabir, M.W.U., 2014, August. Design of a Human Interaction Proof (HIP) using human cognition in contextual natural conversation. In 2014 IEEE 13th International Conference on Cognitive Informatics and Cognitive Computing (pp. 146-154). IEEE. (Year: 2014).*

Agrawal et al., Non-Interactive Zero-Knowledge Proofs for Composite Statements, Advances in Cryptology—CRYPTO 2018, Springer International Publishing, Jun. 3, 2018, pp. 643-673.

Balfanz et al., FIDO UAF Protocol Specification v1.0., FIDO Alliance Proposed Standard, Dec. 8, 2014, 45 pages.

Benarroch et al., Zero-Knowledge Proofs for Set Membership: Efficient, Succinct, Modular, Financial Cryptography and Data Security, Oct. 27, 2019, 68 pages.

Making authentication even easier with FIDO2-based local user verification for Google Accounts, Google Security Blog, Aug. 12, 2019, 5 pages, downloaded at: https://security.googleblog.com/2019/08/making-authentication-even-easier-with_12.html.

Broker et al., Constructing Elliptic Curves of Prescribed Order, PhD thesis, Leiden, 2006, 175 pages.

Camenisch, et al., Proving in zero-knowledge that a number is the product of two safe primes, In International Conference on the Theory and Applications of Cryptographic Techniques, Springer, 1999, pp. 107-122.

Ciolino et al., Of two minds about two-factor: Understanding everyday FIDO U2F usability through device comparison and experience sampling, In Fifteenth Symposium on Usable Privacy and Security (SOUPS 2019), Aug. 2019, pp. 339-356.

Groth et al., One-out-of-many proofs: Or how to leak a secret and spend a coin, Advances in Cryptology—EUROCRYPT 2015—34th Annual International Conference on the Theory and Applications of Cryptographic Techniques, Sofia, Bulgaria, Apr. 26-30, 2015, Proceedings, Part II, vol. 9057 of Lecture Notes in Computer Science, Springer, 2015, pp. 253-280.

Hollier et al., Inaccessibility of Captcha. W3C note, W3C, Dec. 9, 2019, 26 pages, downloaded at: https://www.w3.org/TR/2019/NOTE-turingtest-20191209/.

Jones et al., Web authentication: an API for accessing public key credentials level 2, W3C working draft, W3C, Jul. 30, 2020, 167 pages, downloaded at: https://www.w3.org/TR/2020/WD-webauthn-2-20200730/.

Krol, et al., I don't like putting my face on the Internet !: An acceptance study of face biometrics as a CAPTCHA replacement, In 2016 IEEE International Conference on Identity, Security and Behavior Analysis (ISBA), IEEE, 2016, pp. 1-7.

Krol, et al., Better the devil you know: A user study of two CAPTCHAS and a possible replacement technology, In NDSS Workshop on Usable Security (USEC), vol. 10, 2016, 10 pages.

Langley, Zero-knowledge attestation, ImperialViolet, Jan. 1, 2019, 7 pages, downloaded at: https://www.imperialviolet.org/2019/01/01/zkattestation.html.

Lindemann et al, Web Authentication: An API for accessing Public Key Credentials—Level 2. Candidate recommendation, W3C, Dec. 22, 2020, 177 pages.

Shi et al., Text CAPTCHA is dead? A large scale deployment and empirical study, In The 27th ACM Conference on Computer and Communications Security, 2020, 6 pages.

Tan, Meet Face ID and Touch ID for the Web, Oct. 19, 2020, 16 pages, downloaded at: https://webkit.org/blog/11312/meet-face-id-and-touch-id-for-the-web/.

* cited by examiner

| Tom Curve | Elliptic Curve | Parameters |
|---|---|---|
| Tom-256 | P-256 | $p = 2^{256} - 2^{224} + 2^{192} + 2^{96} - 1$<br>$q =$ 0xffffffff0000000100000000000000017e72b42b30e7317793135661b1c4b117<br>$a' = -3$<br>$b' =$ 0xb441071b12f4a0366fb552f8e21ed4ac36b06aceeb354224863e60f20219fc56 |
| Tom-384 | P-384 | $p = 2^{384} - 2^{128} - 2^{96} + 2^{32} - 1$<br>$q =$ 0xfffffffffffffffffffffffffffffffffffffffffffffffeaf5f689f8669fb41b08d5f5edffd26599c434bbd978917c5<br>$a' =$ 0x32c37e80e91e959293541c7458dfcf03661b1332ea67e516c104e7be722bbc4648c4f1667fbb9cb20d0883fed13e67b1<br>$b' =$ 0x7c4c0a41007acf17975803f9fa4c40ca7eed1fa2efa5d1342e5f4ccbf1c544456c0f33c18f05097b8059baf4ff764990 |
| Tom-521 | P-521 | $p = 2^{521} - 1$<br>$q =$ 0x200000000000000000000000000000000000000000000000000000000000000002c54be78524c33584f734a266748b2063accf5028e6778dc5056476d0690853249<br>$a' =$ 0xef6432c21701cc48c63fb9263e14ba76d4a94ba14d173b134e3032b0e2e543180eb6725125992a7d00162a5f57d21918b076364eeb53c53bb12f405dac1d527e2<br>$b' =$ 0x612d6fb6336d625be6c4f4a91176913e23ff3f6ae212f3ac30aff106f758fa0cf36faa2a6f1d81940e6bb7f65e0cc899ce31112b7480f5827e7f25d4b1369da4f |
| Tom-25519 | Curve25519 | $p = 2^{255} - 19$<br>$q =$ 0x7fffffffffffffffffffffffffffffffecc1495732332411d29df513daa7d2cef<br>$a' =$ 0x4cd4d2b538b218933f229645c0d2610e838b3422a3c1cebd24c255b2cca74f7b<br>$b' =$ 0x576f044056bea4446bfb744333aa222d73773a2a622574254b0a59ad173f9be5 |

FIG. 5

USING A ZERO-KNOWLEDGE PROOF TO PROVE KNOWLEDGE THAT A WEBSITE VISITOR IS A LEGITIMATE HUMAN USER

FIELD

One or more embodiments relate to the field of network computing systems; and more specifically, to using a zero-knowledge proof to prove knowledge that a website visitor is a legitimate human user.

BACKGROUND

Network resources, such as websites and online services, are increasingly susceptible to attacks from bots and malicious crawlers. Designing mechanisms to secure the network resources without sacrificing availability and usability is a difficult task. A common method for preventing bots and malicious crawlers from accessing the network resources requires the client to prove the existence of a human user attempting to access the network resources. In comparison to powerful and distributed networks of bots, humans are assumed to be relatively limited in the damage that they can cause when accessing such network resources. However, the complexity of bots and crawlers has increased making their detection more difficult, causing an increase of the burden of proof on human users.

CAPTCHAs ("Completely Automated Public Turing test to tell Computers and Humans Apart") are a common way of proving a user is a human when requesting access to network resources. In a CAPTCHA, a client is presented with a human-targeted puzzle requiring an interaction with an intention that only a human user can solve (i.e., an algorithm or bot could not solve). The prevalence of bots and malicious crawlers has led domain administrators to use CAPTCHAs for proving that a network resource's visitor is a legitimate human user. However, CAPTCHAs have severe usability problems and are increasingly solvable by automated systems, in particular systems based on machine learning. More challenging tests require greater human effort and cultural knowledge; they may increase accuracy but sacrifice usability. CAPTCHA-based identification procedures have received many criticisms, especially from people with disabilities, but also from other people who feel that their everyday work is slowed down by distorted words that are difficult to read. It takes the average person approximately ten seconds to solve a typical CAPTCHA.

The Web Authentication (WebAuthn) standard is issued for creating attested, scoped, public key-based credentials by web applications for the purpose of authenticating users. Public key credentials are created and bound to authenticators as requested by the web application and scoped to a given relying party. Authenticators provide cryptographic proof of their properties to relying parties via attestation. Many authenticator devices are compliant to WebAuthn including FIDO-supported hardware keys, smartphones, and laptops. WebAuthn has two information flows; one for registration and one for authentication. The registration flow is used to create a new credential scoped to a user and the web application. In the registration flow, the authenticator device generates a new credential keypair (a credential private key and a credential public key), creates an attestation statement that includes the attestation certificate (including the attestation public key and certificate chain) and a signature signed using an internal key of the authenticator device (an attestation private key) over the attested credential public key and the server challenge, and transmits the credential public key, the challenge, and the attestation statement to the server for verification. The server verifies the signature using the attestation public key and conventionally stores the credential public key in its database and associates with the user as well as the characteristics of authentication indicated by attestation. The authentication flow is used if a user has already registered a credential with a website and wants to authenticate to that website using the credential.

SUMMARY

In some embodiments, a system proves that internet traffic is initiated by a human user and not a bot using cryptographic attestations. A server receives a request for a network resource from a client network application of a client device. For example, the request may be for a web page at a particular domain. The server determines to request the client network application challenge the user to verify that the request is initiated by a human user and transmits the request to the client network application. In response to this request, the client network application issues a cryptographic attestation challenge to an attestator. The cryptographic attestation challenge requires a physical interaction of a human user with a hardware component of the attestator. Assuming that the physical interaction is received and validated, the attestator generates a cryptographic attestation that is returned to the client network application. The client network application transmits at least the result of the cryptographic attestation to the server. The server verifies validity of the cryptographic attestation. In response to verifying the validity of the cryptographic attestation, the server fulfils the request.

In some embodiments, instead of transmitting the attestation itself to the server, the client network application generates a zero-knowledge proof of the attestation where a valid attestation is proved without revealing the attestation public key that could be used to verify the attestation. This allows information that can be used to derive the make or model of the hardware device to remain hidden. In a specific example, rather than transmit the cryptographic attestation along with the attestation key and the certificate chain leading to the manufacturer, the client network application transmits a zero-knowledge proof of knowledge demonstrating that the client network application knows a signature of the challenge with a key that is on a server-provided list. The server provided list contains keys only for which there is a certificate chain leading back to the manufacturers' roots. This increases the anonymity set size to the set of all devices that use a given attestation scheme (e.g., ECDSA or RSA) irrespective of the anonymity set size of the device.

BRIEF DESCRIPTION OF THE DRAWINGS

The invention may best be understood by referring to the following description and accompanying drawings that are used to illustrate embodiments. In the drawings:

FIG. 5 shows example parameterizations of curves that can be used in some embodiments.

DESCRIPTION OF EMBODIMENTS

Figure 1:
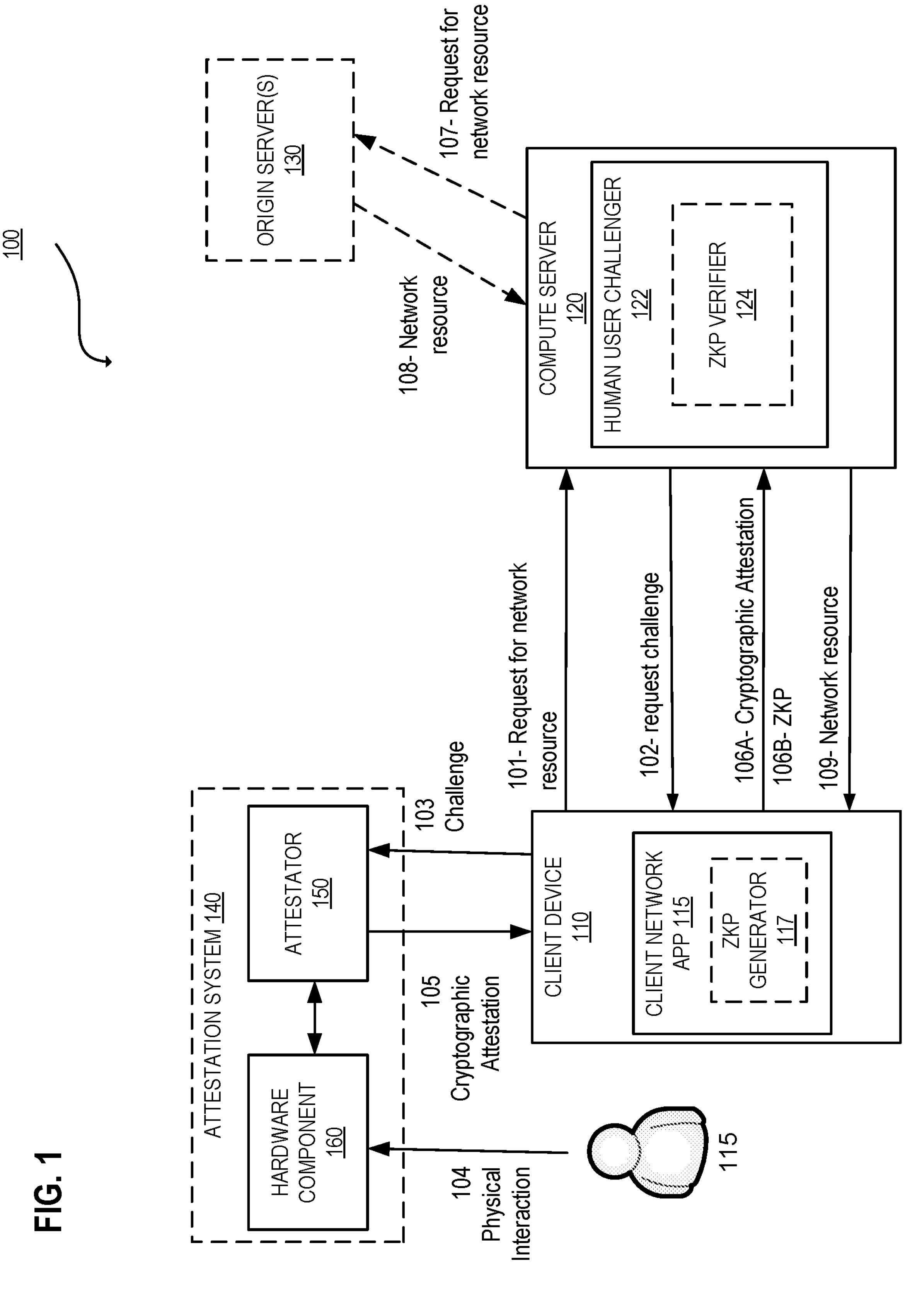
FIG. 1 illustrates a block diagram of an exemplary system for proving that traffic received from a client device is initiated by a human based on a cryptographic attestation, according to some embodiments.

The following description describes methods and apparatus for proving that traffic received from a client device is initiated by a human based on a cryptographic attestation. In embodiments described herein, a cryptographic attestation is used for attesting that a human has interacted with a trusted piece of hardware that can be used to determine that internet requests are initiated from a human user and not a bot. The embodiments described herein present an alternative to the existing challenge-response tests for humans that are based on CAPTCHAs. The mechanisms herein are a usable, pro-privacy alternative that maintains website security and performance. These mechanisms present a "human attestation" as a viable, generalizable alternative to Turing tests.

In one embodiment, a method and system for proving that traffic is received from a client device is initiated by a human is described. A server receives a request for a network resource from a client network application of a client device. For example, the request may be for a web page at a particular domain. The server determines to request the client network application challenge the user to verify that the request is initiated by a human user and transmits the request to the client network application. In response to this request, the client network application issues a cryptographic attestation challenge to an attestator. The cryptographic attestation challenge requires a physical interaction of a human user with a hardware component of the attestator. Assuming that the physical interaction is received and validated, the attestator generates a cryptographic attestation that is returned to the client network application. The client network application transmits at least the result of the cryptographic attestation to the server. The server verifies validity of the cryptographic attestation. In response to verifying the validity of the cryptographic attestation, the server fulfils the request.

In an embodiment, after verifying the validity of the cryptographic attestation, multiple tokens are generated that can be used to bypass future challenges. The tokens may be cryptographically blinded and sent to the server. The server may sign the blinded tokens and return them to the client network application. If a subsequent challenge is detected, instead of performing the attestation, the client network application can transmit a signed token to the server. The server checks the validity of the signed token and if valid, allows the challenge to pass.

In some embodiments, instead of transmitting the attestation itself to the server, the client network application generates a zero-knowledge proof of the attestation where a valid attestation is proved without revealing the attestation public key that could be used to verify the attestation. This allows information that can be used to derive the make or model of the hardware device to remain hidden. In a specific example, rather than transmit the cryptographic attestation along with the attestation key and the certificate chain leading to the manufacturer, the client network application transmits a zero-knowledge proof of knowledge demonstrating that the client network application knows a signature of the challenge with a key that is on a server-provided list. The server provided list contains keys only for which there is a certificate chain leading back to the manufacturers' roots. This increases the anonymity set size to the set of all devices that use a given attestation scheme (e.g., ECDSA or RSA) irrespective of the anonymity set size of the device. In an embodiment, the set of known keys is maintained in a least-recently used (LRU) order and only a subset of most recently used keys is used in the server-provided list. In another embodiment, the set of known keys is maintained in any well-defined order, for example, including but not limited to most-recently used, most-frequently, most known to have sold, dynamic aging, or their combination. In another embodiment, the order of the keys is arbitrary. In another embodiment, different lists may be used for different reasons, in different regions, and number from a single list for the whole system to, for example, individual lists for each region, point of presence, or origin-customer.

In an embodiment, after verifying the validity of the zero-knowledge proof, multiple tokens are generated that can be used to bypass future challenges. The tokens may be cryptographically blinded and sent to the server. The server may sign the blinded tokens and return them to the client network application. If a subsequent challenge is detected, instead of performing the attestation and the zero-knowledge proof, the client network application can transmit a signed token to the server. The server checks the validity of the signed token and if valid, allows the challenge to pass.

The embodiments described herein provide several advantages when compared to existing mechanisms for proving presence of a human behind a request for network resources. For example, in contrast to other solutions, the interaction needs to be between a human and a device to generate the cryptographic attestation. Unlike CAPTCHA-based mechanisms, the solutions presented herein are resilient against artificial intelligence and machine learning systems. The solutions herein eliminate main avenues of attack, increase accessibility, global reach, and reduce cultural barriers.

In an embodiment, one or more mitigation actions are taken to protect against a mass attestation service (e.g., similar to a CAPTCHA farm). For instance, the server may rate limit based on IP addresses or autonomous system numbers (ASNs). As another example, the client device may be required to compute additional values such as hash preimages starting with a given prefix before solving to increase the costs of solution. Such an increase may be indicated based on other signals of client behavior. The signal of humanity may itself be input to a multifactorial decision-making system for determining if access is allowed. Such information may include information from the origin server about past interactions with the client, geographic, hardware, API support, or any other signal on the likely origin of a request. As another example, the server may revoke key(s) from the set of acceptable keys.

FIG. 1 illustrates a block diagram of an exemplary system for proving that traffic received from a client device is initiated by a human, according to some embodiments. The system 100 includes a compute server 120, a client device 110, an attestation system 140, and an optional origin server 130.

The client device 110 is a computing device (e.g., laptop, workstation, smartphone, mobile phone, tablet, gaming system, set top box, wearable device, Internet of Things (IoT) device, etc.) that can transmit and/or receiving network traffic. The client device executes a client network application 115 such as a web browser, native application, or other application that can access network resources (e.g., web pages, images, word processing documents, PDF files, movie files, music files, or other computer files). The client device 110 is operative to transmit a request 101 for a network resource through a network via the client network application 115. The client device 110 is operative to receive response(s) from the compute server 120 through the client network application 115. Typically, multiple client devices communicate with the compute server. In an embodiment, the client network application 115 supports a hardware-based authentication standard such as the WebAuthn standard in the presence of the attestation system 140.

The system further includes an attestation system 140. The attestation system 140 is used to provide cryptographic attestations that a human user has taken a predefined action on a trusted device. The attestation system 140 includes a hardware component 160 and an attestator 150. The hardware component 160 is a piece of hardware that can be used by a human user to perform a physical interaction. For example, the hardware component 160 can be a capacitive touch sensor, a touch pad, a keyboard, a camera, a biometric reader, etc. The attestator 150 is a cryptographic entity that is hardware and/or software that securely communicates with the hardware component 160, receives requests for generation of cryptographic credentials, and securely generates the cryptographic credential and a cryptographic attestation based upon the interaction of a user with the hardware component 160. In some embodiments, the attestator 150 and the hardware component 160 can be included in a same physical electronic device. In other embodiments, the hardware component 160 and the attestator 150 can be implemented on separate physical electronic devices. In these embodiments, the hardware component 160 and the attestator are communicatively coupled through a secure communication interface.

In some embodiments, the attestation system 140 is included within the client device 110. As an example, the client device 110 may be a smartphone and the hardware component 160 may be a camera or other biometric reader (e.g., a fingerprint reader) and the attestator 150 may be part of a secure processing component of the client device 110. For example, a Trusted Execution Environment (TEE) or Trusted Platform Module (TPM) system that can attest to a human interaction (e.g., a gesture performed by a human) can be used. In other embodiments, the attestation system 140 is included in a separate device that is connected, either through a direct physical connection or a wireless connection, to the client device 110. As an example, the attestation system 140 may be implemented by a hardware security key such as a YubiKey or a Titan Security Key.

In some embodiments, the attestation system 140 is WebAuthn compliant and acts as a WebAuthn authenticator and the compute server 120 also implements WebAuthn and is a WebAuthn relying party.

In an embodiment, the client network application 115 executes the zero-knowledge proof (ZKP) generator 117. The ZKP generator 117 may be provided through an API of the client network application 115, through a client-side script included in a resource received from the compute server 120, or through a binary executed by the client network application 115. As will be described in greater detail later herein, the ZKP generator 117 generates a zero-knowledge proof of the attestation signature without revealing the public key that could be used to verify the attestation.

The compute server 120 is an electronic device. The compute server executes the human user challenger 122 to initiate challenges and verify the result. As an example, upon receipt of a request for a network resource, the compute server 120 is operative to process the received request and initiate a mechanism for determination that the user of the client device 110 is a human before fulfilling the request. In some embodiments, the compute server 120 also executes a ZKP verifier 124 that verifies a ZKP proof received from a client network application.

The compute server 120 can be part of many compute servers of a cloud computing infrastructure. The cloud computing infrastructure can provide different services to users. The multiple compute servers can be geographically distributed (e.g., in different locations throughout the world). There may be hundreds of compute servers as part of the cloud computing infrastructure. The cloud computing infrastructure can provide services such as protecting against internet-based threats, providing performance services for customers (e.g., acting as a content delivery network (CDN) and dynamically caching customer's files close to visitors, page acceleration, etc.), TCP stack optimizations, and/or other services. Each one of the compute servers may host a service that is offered by the cloud computing infrastructure to customers or users. The compute servers may also host services and/or functionalities that are used to support the service offered by the same or other compute servers. For example, a compute server may implement control functionalities, DNS service (e.g., one or more authoritative name servers, one or more proxy DNS servers), a proxy service, a CDN service, TCP stack optimization, a caching service, etc. In some embodiments, the compute server 120 is operative to host the service(s) of the cloud computing infrastructure.

The origin server 130, which may be owned or operated directly or indirectly by customers of the cloud computing infrastructure, is a computing device on which a network resource resides, is generated, and/or otherwise originates (e.g., web pages, images, word processing documents, PDF files movie files, music files, or other content items). Although FIG. 1 illustrates the origin server 130 communicating with the compute server 120, the origin server 130 may also communicate with one or more of the other compute servers (not illustrated). In some embodiments, the compute server 120 and the origin server 130 are the same (i.e., the compute server 120 is an origin server).

The operations of the system 100 will be described with respect to the block diagrams and flow diagrams of FIGS. 2A-3F.

Figure 2A:
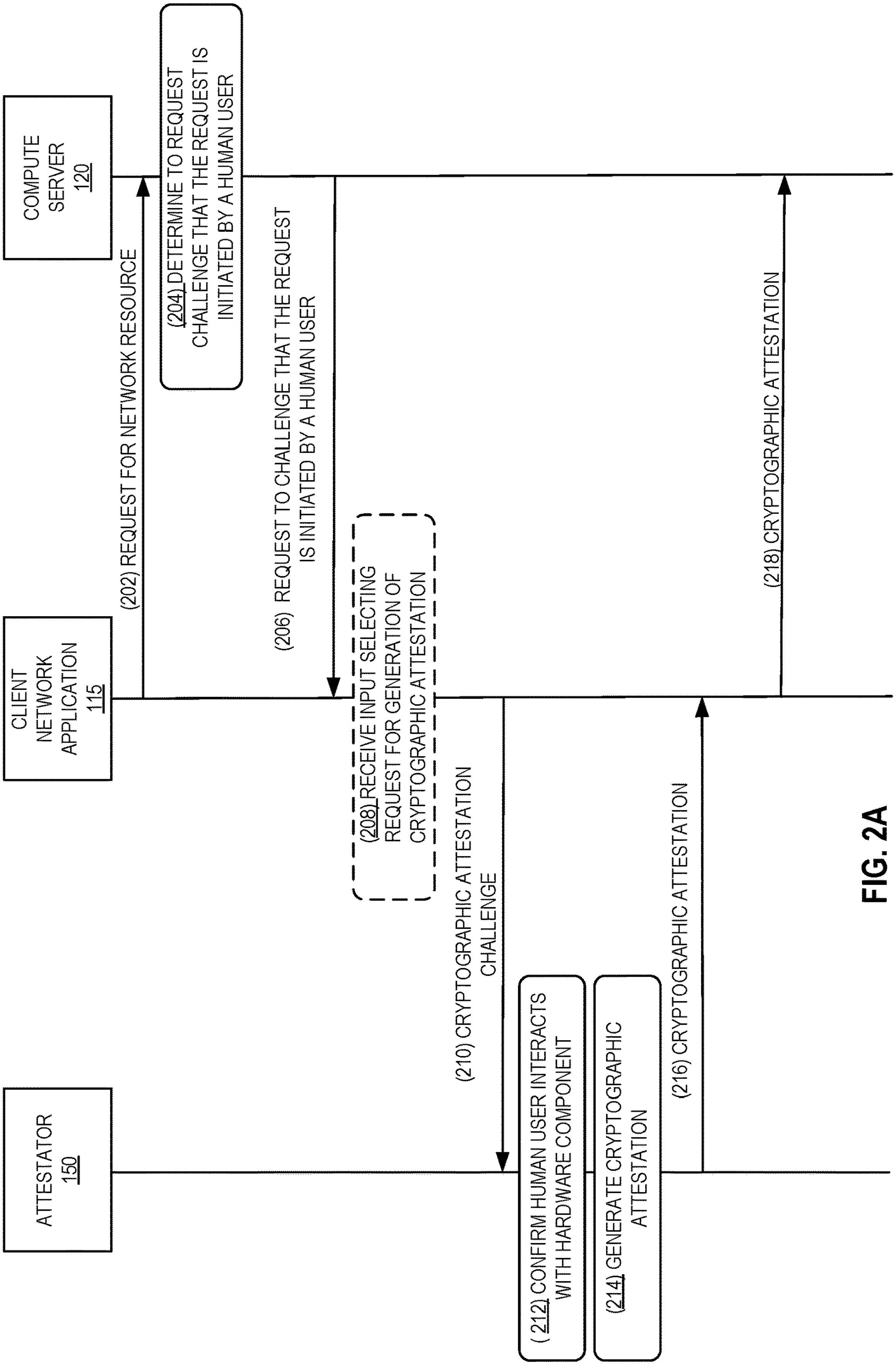
FIG. 2A illustrates a block diagram of exemplary operations for proving that traffic received from a client device is initiated by a human based on a cryptographic attestation, according to some embodiments.

FIG. 2A illustrates a block diagram of exemplary operations for proving that traffic received from a client device is initiated by a human based on a cryptographic attestation, according to an embodiment. At operation 202, the client network application 115 transmits a request 101 (e.g., HTTP GET request, etc.) for a network resource. The compute server 120 receives this request.

The compute server 120, determines, at operation 204, to request the client network application 115 challenge that the request is initiated by a human user. The determination to request a challenge can be done differently in different embodiments. For example, an owner of the requested resource (e.g., a domain owner) may specify that requests are subject to challenge and the compute server 120 may apply this configuration. As another example, a threat score can be determined for the client network application and the challenge may be requested if the threat score provides an indication that the request may not be from a human user. As another example, the challenge may be requested based on one or more attributes of the client device, client network application, and/or request (e.g., client device type, client network application type, source IP address of the request, country of origin of the source IP address of the request). As another example, the challenge may be requested randomly (e.g., each X request).

After determining to request a challenge that the request is initiated by a human user, the compute server 120 transmits, at operation 206, a request 102 to the client network application 115 to challenge whether the request is initiated by a human user. The challenge may require a physical interaction of the human user with a hardware component 160. In some embodiments, the request further includes a CAPTCHA challenge for the user of the client device 110 in lieu of, or in addition to, the physical interaction challenge.

Figure 2B:
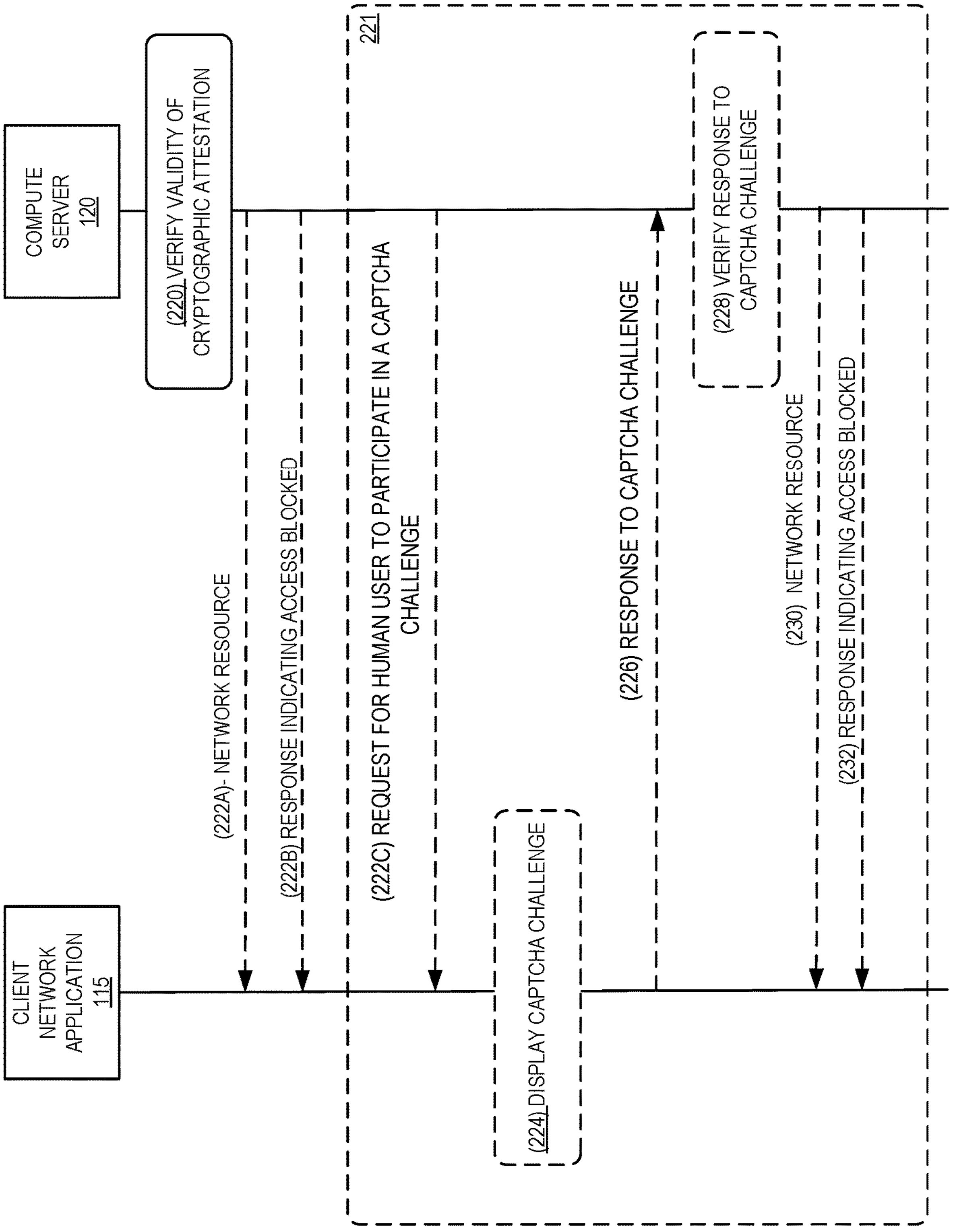
FIG. 2B illustrates a block diagram of exemplary operations for proving that traffic received from a client device is initiated by a human based on a cryptographic attestation, according to some embodiments.

The challenge request may be included or referenced in a web page. The web page may include, for example, a choice for the user of the client device to select between a CAPTCHA challenge or a physical interaction challenge. In such an embodiment, the client network application 115 receives, at operation 208, an input from the user, in which the user selects between the CAPTCHA challenge and the physical interaction. When the user selects a CAPTCHA challenge, the operations described with respect to operation 221 of FIG. 2B are performed. When the user selects the physical interaction, a physical interaction challenge is made.

In an embodiment, after receiving a selection of a physical interaction challenge, the client network application 115 and the compute server 120 coordinate the challenge parameters. In another embodiment, the challenge parameters are included in the page received from the server. In another embodiment the client network application computes the challenge value via evaluation of a JavaScript or other remote code technology containing anti-reverse engineering and environmental characterization techniques such as canvas fingerprinting or font support fingerprinting.

In an embodiment, at least part of the WebAuthn registration framework is used for the physical interaction challenge, and the authentication flow of WebAuthn is not used. The WebAuthn registration framework has 3 high-level stages. First, the compute server 120 requests a physical interaction challenge from the client network application 115 in response to a username. This username may not be used, or a default/dummy username may be used in some embodiments (e.g., the username does not need to identify or belong to the user of the client network application 115). For instance, the compute server 120 may issue a challenge request that includes a randomly generated value by the compute server 120 (sometimes referred to as the "challenge"), information about the compute server 120 (e.g., an identifier of the relying party such as a URL or a domain name), information about the user such as a username or a server-assigned identifier, and configuration options dictating the type and format of the attestation object that the relying party expects. For example, the challenge request may be compliant to the PublicKeyCredentialCreationOptions of the WebAuthn standard.

The client network application 115 receives the challenge request parameters and issues a challenge 103 for a cryptographic attestation to the attestator 150 at operation 210. This is the second high-level stage of the registration framework. The client network application 115 initiates the WebAuthn-supported hardware process in which a human user must take an action. The attestator 150 receives the challenge request for the cryptographic attestation. In some embodiments, the client network application 115 causes a prompt to be displayed to perform a physical interaction 104 with the hardware component 160. For example, the prompt may instruct the user to look into a camera of the client device 110, touch a capacitive sensor of the hardware component, present a fingerprint, enter a PIN, etc. The user may be prompted to provide consent or authorization through this gesture with the hardware component. The interaction of the human user and the hardware component is a test of human user presence, and involves an action that can be performed only by a user and not by a bot. For instance, a bot cannot provide a capacitive touch.

The third high-level stage of the registration framework has the client network application 115 obtaining a credential containing a proof of that action (e.g., an attestation in the form of a digital signature) and transmitting it to the compute server 120, which then verifies the proof. The proof of the action may include the attestation, a credential public key, and the challenge. The proof of the action may be signed using an internal secret key of the attestation system 140. The compute server 120 may discard the credential public key once the attestation is verified.

For instance, after the attestator 150 confirms that the user has interacted with the hardware component, at operation 212, the attestator 150 generates a cryptographic attestation 105 at operation 214. The attestator 150 may create a new asymmetric key pair (a credential private key and a credential public key) and store the credential private key. The credential public key may be included as part of the cryptographic attestation which is signed using the attestation private key (e.g., the internal secret key of the attestation system). The certificate chain leading to the manufacturer may also be returned. The attestator 150 returns the cryptographic attestation to the client network application 115 at operation 216, and may also return the public key and the challenge. At operation 218, the client network application 115 transmits a response 106A to the request that includes the cryptographic attestation (and potentially the public key and the challenge) to the compute server 120 which the compute server 120 receives. For instance, the attestation may be sent in an attestationObject that contains attestator data (including the attested credential data such as the public key) and an attestation statement (including the attestation signature and the certificate chain), and the challenge may be sent in client data included within an AuthenticatorAttestationResponse message.

FIG. 2A illustrates an embodiment where the attestation signature and potentially attestator data (such as the public key and the certificate chain) are sent to the compute server for verification. In other embodiments, as described herein, instead of transmitting the attestation signature and other attestator data such as the public key to the compute server for verification, the client network application 115 generates and transmits a zero-knowledge proof of the attestation to the compute server 120 that allows for the attestation to be proved without revealing the public key that could be used to verify the attestation. In such an embodiment, the client network application 115 transmits the response 106B that includes the zero-knowledge proof of the attestation signature.

The compute server 120 may verify either the attestation signature or the zero-knowledge proof depending on the embodiment. If valid, the compute server 120 may retrieve the requested network resource which may include transmitting the request 107 for the network resource to the origin server and receiving a response 108 from the origin server that includes the requested resource. The compute server 120 may then transmit a response 109 that includes the requested network resource to the client device 110.

FIG. 2B illustrates a block diagram of continued exemplary operations for proving that traffic received from a client device is initiated by a human based on a cryptographic attestation, according to an embodiment. At operation 220, the compute server 120 verifies the validity of the cryptographic attestation. For instance, the compute server 120 may validate that the challenge matches the value provided earlier, validates that the attestator data provided is structured correctly, and that the attestation verifies successfully. Verifying the validity of the attestation includes verifying the digital signature over the data in the credential using the certificate chain in the attestation statement. The compute server 120 may discard the public key once the attestation is verified.

When the cryptographic attestation is determined to be valid, this is an indication that a human user has interacted with a hardware component from a compliant device. The compute server 120 determines that the request for the network that was received from the client network application 115 was initiated by a human instead of a bot. In this case, the compute server 120 fulfills the first request received from the client network application. In some embodiments, fulfilling the request includes transmitting the requested network resource, at operation 222A.

Alternatively, when the cryptographic attestation is determined to be invalid or otherwise fails verification, the compute server 120 may transmit a response indicating that access to the requested network resource is blocked, at operation 222B. In some embodiments, instead of immediately blocking the transmission of the network resource, the compute server 120 transmits a request for participation in a CAPTCHA challenge at operation 222C. Thus, in these embodiments, if the physical interaction challenge fails, the compute server 120 causes a CAPTCHA challenge to be presented and displayed at operation 224. The client network application 115 transmits a response to the CAPTCHA challenge at operation 226, in response to a human user participating in the CAPTCHA challenge. The compute server 120 verifies at operation 228, the response to the CAPTCHA challenge. When the response is accurate, the compute server 120 transmits the network resource in response to the request at operation 230. Alternatively, the compute server 120 transmits a response indicating that access to the network resource is blocked at operation 232 when the CAPTCHA response is not accurate.

In an embodiment, after verifying the validity of the cryptographic attestation, multiple tokens are generated that can be used to bypass future challenges. The tokens may be cryptographically blinded and sent to the compute server 120. The compute server 120 may sign the blinded tokens and return them to the client network application 115. If a subsequent challenge is detected, instead of performing the attestation, the client network application 115 can transmit a signed token to the compute server 120. The compute server 120 checks the validity of the signed token and if valid, allows the challenge to pass.

Figure 3A:
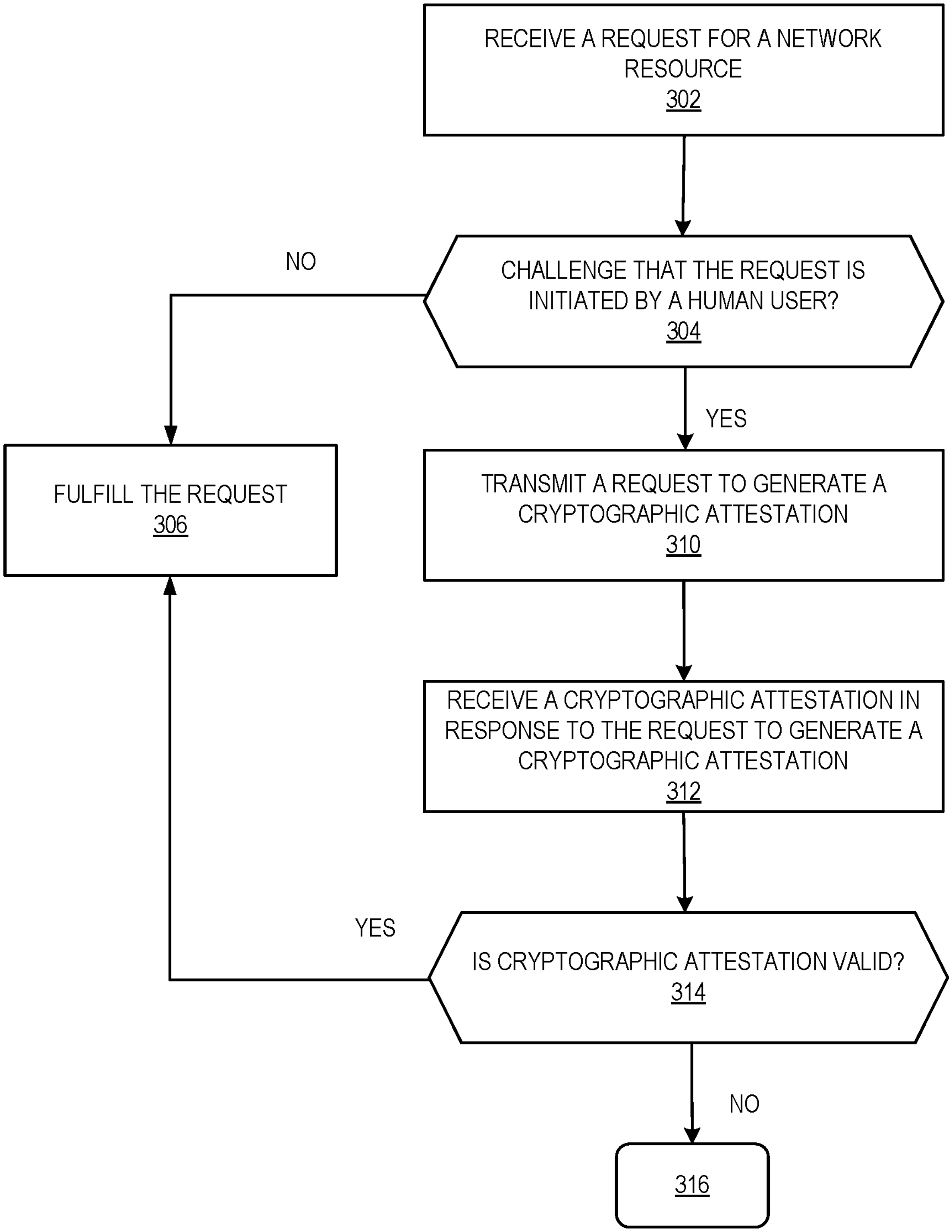
FIG. 3A illustrates a flow diagram of exemplary operations for proving that traffic received from a client device is initiated by a human based on a cryptographic attestation, according to some embodiments.

FIG. 3A illustrates a flow diagram of exemplary operations for proving that traffic received from a client device is initiated by a human based on a cryptographic attestation, according to an embodiment. At operation 302, the compute server 120 receives a request for a network resource from the client network application 115. The request can be an HTTP GET request, for example. The network resource can be hosted on an origin server 130. In some embodiments, the compute server 120 acts as a proxy server for the origin server 130 and receives the request instead of the origin server 130.

The flow of operations moves to operation 304. At operation 304, the compute server 120 determines to request the client network application 115 challenge that the request is initiated by a human user. The challenge request may be for a physical interaction challenge of a compliant device. In some embodiments, the determination to request the challenge is described with reference to FIG. 3C. If a challenge request is to be sent, then the flow of operations moves to operation 310. If a challenge request is not to be sent, then the flow of operations moves to operation 306 where the request is fulfilled. In some embodiments, operation 306 can be performed as described with reference to FIGS. 3E-F.

At operation 310, the compute server 120 transmits the challenge request to the client network application 115. The challenge request may be included or referenced in a web page returned from the compute server 120 to the client network application 115. In an embodiment, the web page may a choice for the user to select between a CAPTCHA challenge or a physical interaction challenge. The physical interaction challenge involves a physical interaction of the human user with a hardware component of a class of hardware devices that can be used for involving an interaction with a human user in the generation of a cryptographic attestation.

If the challenge request is consented by the client, the client network application 115 and the compute server 120 coordinate the challenge parameters. For instance, the compute server 120 may transmit the challenge (e.g., a random value) to the client network application 115, information about the compute server 120 (e.g., an identifier of the relying party such as a URL or a domain name), information about the user such as a username or a server-assigned identifier, and configuration options dictating the type and format of the attestation object that the relying party expects. The client network application 115 may display a prompt to perform a physical interaction with the hardware component 160. For example, the prompt may instruct the user to look into a camera of the client device 110, touch a capacitive sensor of the hardware component, present a fingerprint, enter a PIN, etc. The user may be prompted to provide consent or authorization through this gesture with the hardware component. If the attestator 150 confirms that the user has interacted with the hardware component 160, the attestator 150 generates a cryptographic attestation that is signed using an internal secret key of the attestation system 140 over the attested credential public key and a challenge. The attestator 150 returns the cryptographic attestation to the client network application 115 which in turns transmits the cryptographic attestation to the compute server 120. The cryptographic attestation may include attestator data (including the attested credential data such as the public key) and an attestation statement (including the attestation signature and possibly the certificate chain). The client network application 115 may also transmit the challenge to the compute server 120 and the certificate chain.

At operation 312, the compute server 120 receives the cryptographic attestation in response to the request in operation 310. The flow of operations moves to operation 314. At operation 314, the compute server 120 verifies if the cryptographic attestation is valid. For example, the compute server 120 may validate that the challenge matches the value provided earlier, validates that the attestator data provided is structured correctly, and that the attestation verifies successfully. Verifying the validity of the attestation includes verifying the digital signature over the data in the credential using the certificate chain in the attestation statement. When the cryptographic attestation is determined to be valid, this is an indication that a human user has interacted with a trusted hardware device for enabling the generation of the cryptographic attestation. If the cryptographic attestation is valid, the compute server 120 considers the request is received by a human user and not a bot. If the cryptographic attestation is valid, the operations move to operation 306, at which the compute server 120 fulfills the original request. Alternatively, when the cryptographic attestation is determined to be invalid, the operations moves to operation 316.

In an embodiment where the client network application may be issued one or more tokens upon successfully completing a challenge, instead of the compute server 120 receiving a cryptographic attestation at operation 312, the compute server 120 may receive a signed token. The compute server then determines whether the signed token is valid instead of performing operation 314. If the signed token is valid, then operation 306 is performed. If the signed token is not valid, then operation 316 would be performed.

Figure 3B:
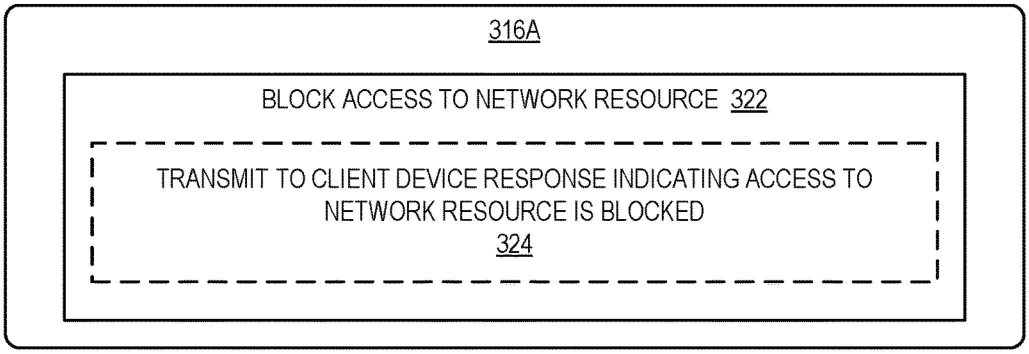
FIG. 3B illustrates a flow diagram of exemplary operations that can be performed in response to verification of invalidity of a cryptographic attestation, according to some embodiments.

FIG. 3B illustrates a flow diagram of exemplary operations that can be performed in response to verification of invalidity of a cryptographic attestation, according to some embodiments. If the compute server 120 determines that the cryptographic attestation is not valid, the compute server 120 may perform operation 316A. At operation 322, the compute server 120 blocks access to the network resource. In some embodiments, the compute server 120 may transmit a response to the client device, where the response indicates that access to the requested network resource is blocked, at operation 324. In other embodiments, no response is sent to the client device.

Figure 3C:
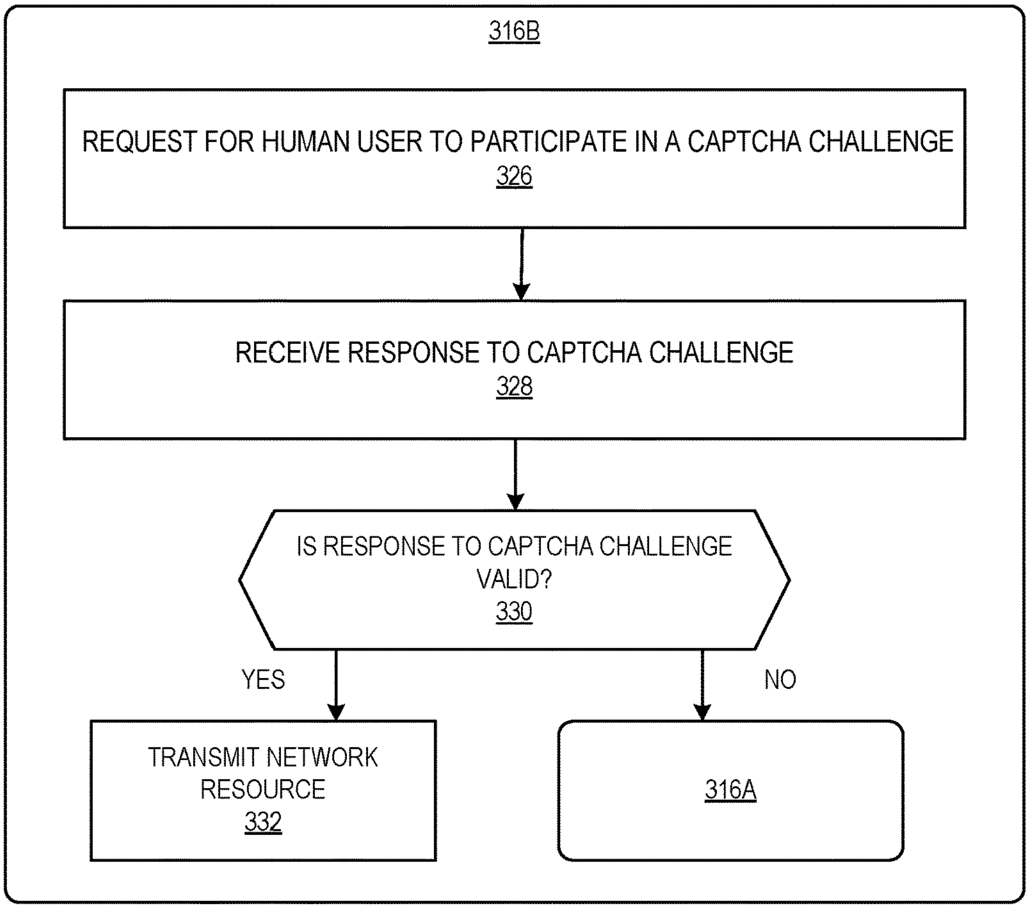
FIG. 3C illustrates a flow diagram of exemplary operations that can be performed in response to verification of validity of a cryptographic attestation, according to some embodiments.

FIG. 3C illustrates a flow diagram of exemplary operations that can be performed in response to verification of validity of a cryptographic attestation, according to some embodiments. If the compute server 120 determines that the cryptographic attestation is not valid, instead of blocking the transmission of the network resource the compute server 120 may perform operation 316B. At operation 326, the compute server 120 transmits a request for participation in a CAPTCHA challenge. The request causes the client device 110 to display a CAPTCHA challenge to the user. The compute server 120 receives, at operation 328, a response to the CAPTCHA challenge. The compute server 120 verifies at operation 330, the response to the CAPTCHA challenge. If the response is accurate, the compute server 120 transmits the network resource in response to the request at operation 332. Alternatively, the compute server 120 may perform the operations 316A if the CAPTCHA response is not accurate.

Figure 3D:
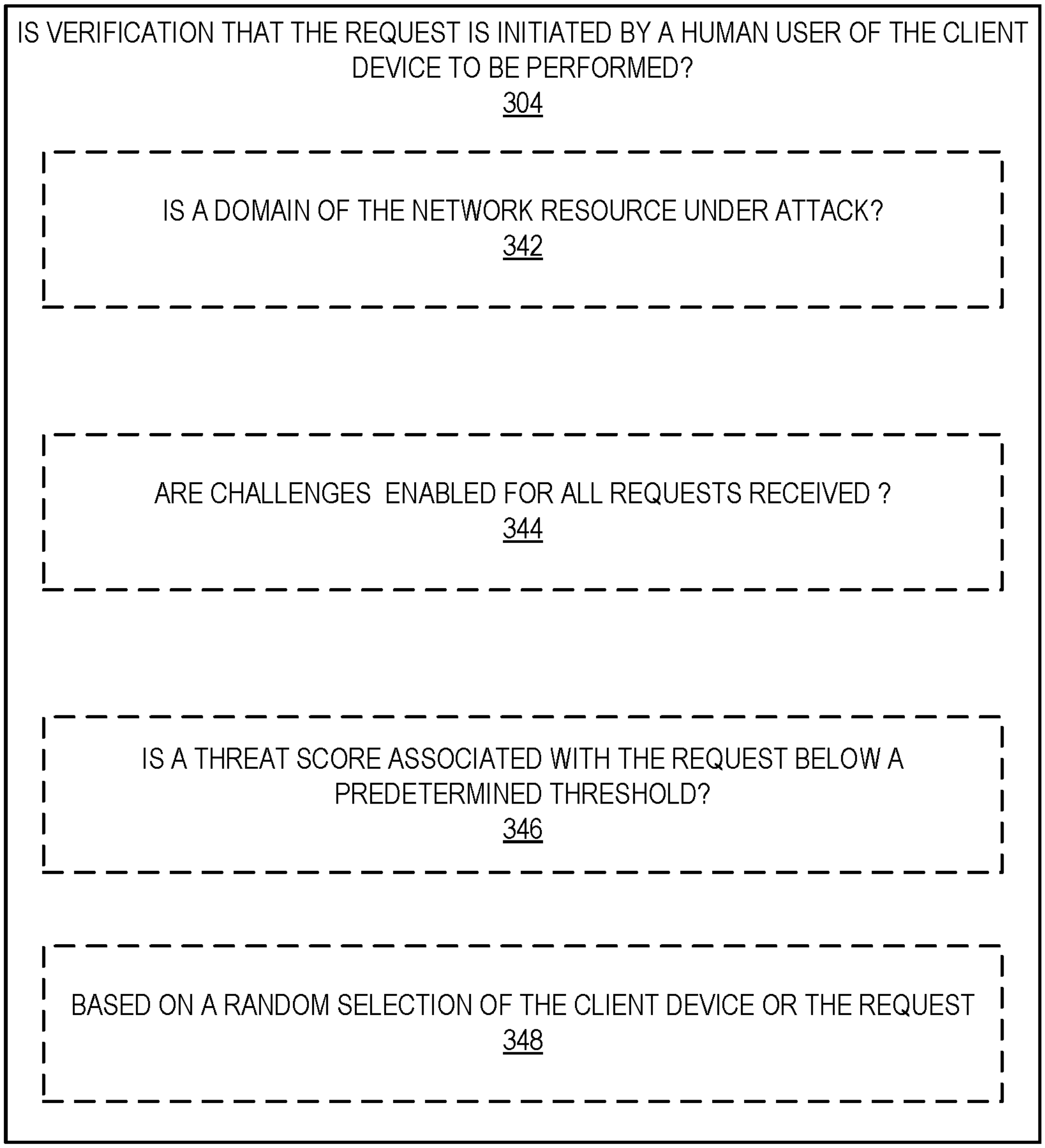
FIG. 3D illustrates a flow diagram of exemplary operations that can be performed for verification that a request is initiated by a human user is to be performed, according to some embodiments.

FIG. 3D illustrates a flow diagram of exemplary operations that can be performed for determining whether to request a challenge according to some embodiments. In some embodiments, determining whether to request a challenge that a human user is initiating the traffic can include one or any number of combination of operations 342-348. At operation 342, the compute server determines that a challenge should be requested if there is a determination that the domain of the network resource is subject to a denial-of-service attack. For example, the domain of the network resource can be associated with an under-attack attribute indicating a higher level of security for requests for that domain. The under-attack attributes may be set by an owner and/or administrator of the domain, and/or the server on which the domain is hosted. In some embodiments, the compute server 120 or other server in the network may determine automatically, based on an analysis of traffic for the domain, that the domain is under attack.

Additionally, or alternatively, requesting a challenge may be enabled for all requests received for network resources at that domain at operation 344. Additionally, or alternatively, the requesting a challenge may be done if a verification configuration setting is enabled and applicable for the requested domain or resource. Additionally, or alternatively, determining to request a challenge may be done depending on a threat score associated with the request and/or client network application (e.g., whether the threat score indicates the request is likely from a bot). For example, the compute server 120 or other network may determine a threat score for each client network application from which requests are received. The client network application can be identified by an IP address and the compute server may associate a threat score to that IP address to decide whether to request a physical interaction challenge. Additionally, or alternatively, determining to request a challenge can be performed based on a random selection of the client network application or the request received at the compute server 120.

Figure 3E:
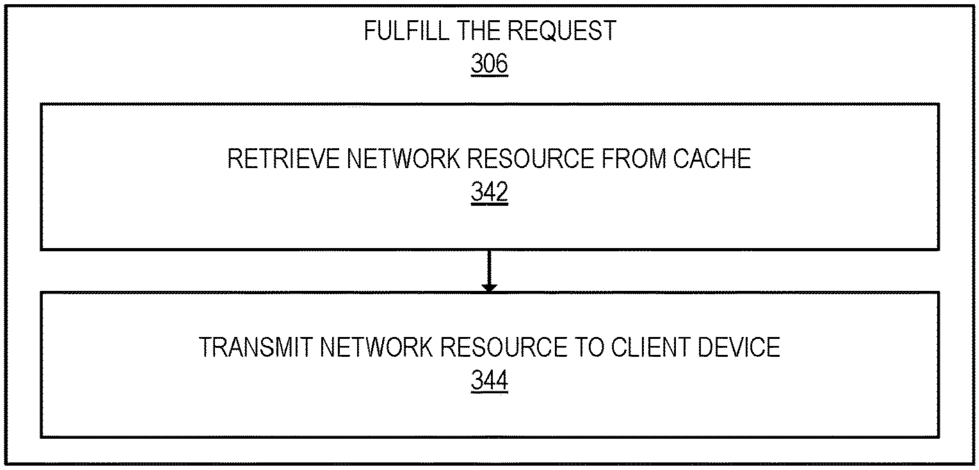
FIG. 3E illustrates a flow diagram of exemplary operations that can be performed for fulfilling a request, in accordance with some embodiments.
Figure 3F:
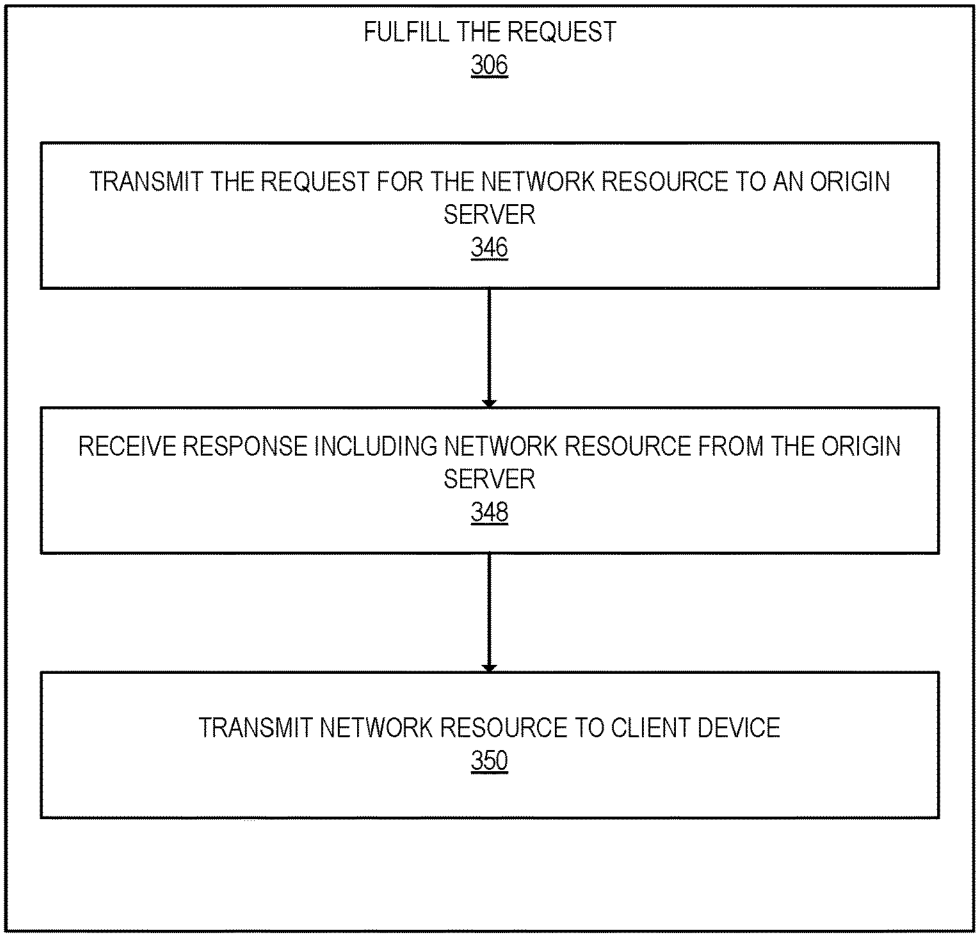
FIG. 3F illustrates a flow diagram of exemplary operations that can be performed for fulfilling a request, in accordance with some embodiments.

In some embodiments, fulfilling a request may include operations of FIG. 3E. In some embodiments, fulfilling a request includes the operations of FIG. 3F. FIG. 3E illustrates a flow diagram of exemplary operations that can be performed for fulfilling a request, in accordance with some embodiments. At operation 342, the compute server 120 retrieves the network resource from a cache. The compute server 120 transmits the network resource to the client device, at operation 344. FIG. 3F illustrates a flow diagram of exemplary operations that can be performed for fulfilling a request, in accordance with some embodiments. At operation 346, the compute server 120 transmits a request for the first network resource to an origin server, e.g., origin server 130. The compute server 120 receives a response including the network resource from the origin server 130, at operation 348. At operation 350, the compute server 120 transmits the network resource to the client device 110.

Embodiments have described using a cryptographic attestation to prove a human user is interacting with a client device. In some of these embodiments, the attestation is generated by a hardware device using a secret key embedded during manufacture that is shared across a cohort of devices such as the same model or manufactured in the same year. The attestation process may reveal such hard-coded certificate associated with that device cohort.

As an alternative, in some embodiments, a zero-knowledge proof of the cryptographic attestation is used to prove the validity of the attestation without revealing the public key that could be used to verify the attestation. The zero-knowledge proof demonstrates that the signature of the message was generated by someone with a private key for a public key on a list without revealing which entry of the list (which public key) was used. For instance, the cryptographic attestation is converted to a proof of knowledge of the signature under a committed key, and that committed key is in an accumulator sent by the server. This preserves the privacy of the users by obscuring which device model was used to generate the attestation signature, while preserving the proof that the attestation signature was generated by a trusted attestator. The server receives the response and verifies the zero-knowledge proof and if verified, allows access to the resource. Thus, attestations containing privacy-preserving zero-knowledge proofs are sent instead of attestation data that could identify the hardware device of the client. The zero-knowledge proof that is generated may include multiple proofs that are themselves zero-knowledge proofs.

It is possible in some cases that the server will encounter a key that is not already on the server provided list. If a key that is not in the accumulator is added, then all existing witnesses to membership become invalid which forces the client to look up new witnesses. In some embodiments, to register a new key, the client network application transmits the certificate chain leading to a trusted root maintained by the manufacturer and then obtains a new list of available keys that includes the offered key. Although this reveals the attestation public key, and thus the model or batch of the user's device, the request is a one-time event with a small amount of data.

In some embodiments, the zero-knowledge proof is implemented in a client network application such as an Internet browser. Elliptic curves are used and generated with convenient orders to reduce the number of relations to prove, and a Pedersen hash is used to reduce the arithmetic complexity of the statements to prove. The proofs of relations are simpler by committing numbers in the P-256 base field by generating an elliptic curve whose order is the same as the P-256 base field. This greatly reduces the number of arithmetic relations needed to prove correct reduction. For instance, without this step, every arithmetic relation would need to be converted into multiple relations proving correct reduction, which would create many more multiplications.

In some embodiments, the attestation signature is an Elliptic Curve Digital Signature Algorithm (ECDSA) signature. ECDSA signatures are generated using standardized elliptic curves defined over prime fields. These curves are defined by the general equation $y^2=x^3-3x+b$, which in turn leads to a prime group $E(\mathbb{F}_p)$ of prime order n over a field of a specified prime order p. To prove relations among commitments to values in $\mathbb{F}_p$ (e.g., commitments of the coordinates of a point), it is convenient to operate in a group that has order p. In an embodiment, the elliptic curves used have a desired order, and are generated when the prime is one of the SEC specified curves and defined as $y^2=x^3+a'x+b'$ along with a prime q such that $E'(\mathbb{F}_q)$ has prime order equal to p. These curves are known herein as Tom curves. FIG. 5 shows example parameterizations of some curves (a P-256 curve, a P-384 curve, a P-521 curve, and a Curve25519). The Tom curves reduce the complexity of the relations proved because the relation z=x*y can be directly proved. By adopting a one-time group generation procedure, the proof of arithmetic relation is simplified. Without a convenient group, one would have to work in a group sufficiently large so that xy does not overflow, which leads to additional complexity. For example, proving that a commitment to z is a commitment to xy, one proves knowledge of r such that $z=xy-rN$ and proves that r is sufficiently small, and that z is in the correct range. This example would include substantially more commitments than a proof that z=xy modulo the group order.

In some embodiments the order of the auxiliary curve is rp, where r is a small positive integer such as 2 or 4 or 8, or any larger convenient number. Such embodiments enable the use of more efficient curve shapes such as Edwards curves, curves of the form ax^2+y^2=1+dx^2y^2. The cofactor may be addressed such as working in the quotient group or checking that all elements are prime order.

In some embodiments the auxiliary curve is converted via isogenies into an alternate form, the isogenies having kernel equal to the subgroup of points of order r on the Tom curve. This enables high efficiency curve arithmetic without the complications introduced by the cofactor.

In some embodiments the auxiliary curve is a pairing friendly curve, of order rp where r is large, and p|q^k−1 for a small k. Such a curve has a pairing from two subgroups of order p into the multiplicative group of an extension of $\mathbb{F}_q$. This pairing enables use of faster and smaller succinct non interactive arguments of knowledge.

The following notation is used when describing an example of a zero-knowledge ECDSA-based attestation according to an embodiment. Let G be the generator of the elliptic curve group of order n. The ECDSA signature has two scalars r and s. The message to be signed is rn, and z is the truncation. Given an ECDSA signature (r, s) for a message in with a hash h=hash(m) and a public key Q, the value r does not reveal any information about the public key Q because r is generated uniformly at random. R, one of the points that has x-coordinate equal to r, can also be used. The ECDSA verification equation is $R=u_1G+u_2Q$, where $u_1=ts^{-1}$ mod n and $u_2=rs^{-1}$ mod n, and t is derived from h. By rewriting it as $u_2^{-1}R-tr^{-1}G=Q$, this equation has only a single multiplication with a hidden coefficient, and then an addition of a public point. This translates directly to a double discrete logarithm proof. This is the form of ECDSA signature verification that our statement encodes.

In some embodiments, a class of zero-knowledge proofs (ZKPs) known as Sigma protocols is used. In such embodiments, the public key Q is committed and the ZKP is completed in two stages. The first stage proves the knowledge of a valid ECDSA signature with respect to the committed public key Q. The second stage proves that the committed public key Q belongs to a larger anonymity set containing many more public keys.

In an embodiment the commitment to a value x includes computing xG+rH where r is a random value, and G and H are points in a group where the Computational Diffie Hellman problem is cryptographically strong. This is a Pedersen commitment.

In an embodiment, the proof of multiplication of committed values where Cx is a commitment to x, Cy a commitment to y, Cz a commitment to z, where z is x*y, includes the prover computing an auxiliary commitment C4=x*Cy, then proving knowledge of exponents x, y, z, rx, ry, rz, r4, such that C4=x*Cy, Cz=C4+r4*H, Cy=y*G+ry*H, Cx=x*G+rx*H.

In an embodiment, given points S+T=U on an elliptic curve, and commitments Csx, Csy, Ctx, Cty, Cux, Cuy to the x and y coordinates of these points respectively, the proof (itadd) that addition is correct includes transmitting additional values representing the intermediate values in the evaluation of the affine addition formula for elliptic curves, and then proving that each of these intermediate values has been correctly computed.

In an embodiment, the first stage of proving the knowledge of a valid ECDSA signature with respect to the committed public key Q includes performing a proof of correct exponentiation and then a proof of addition. For example, R and z are let known to the verifier. The prover publishes R and performs a proof of correct exponentiation where $C_1$ is $Com_E$ (λ) and ($C_2$,$C_3$) is $Com_{E^t}$ (kg) where $C_2$ and $C_3$ are commitments to the x and y coordinates, respectively. To show that this is correctly formed, the following sigma protocol with bit challenges for 128 rounds is parallelly combined. In each iteration, the prover picks α, $\beta_1$, $\beta_2$, $\beta_3$ at random and computes $a_1=\alpha g+\beta_1 h$, $a_2=\gamma_1 g^t+\beta_2 h^t$, $a_3=\gamma_2 g^t+\beta_3 h^t$ where ($\gamma_1$, $\gamma_2$)=ag. The commitments $a_1$, $a_2$, $a_3$ are sent to the verifier. The verifier responds with a single bit challenge c. If c=0 the prover responds with (α, $\beta_1$, $\beta_2$, $\beta_3$), opening the commitments. If c=1 the prover computes $z_1=\alpha\lambda$, and proves that $T=z_1 g=(\gamma_1, \gamma_2)-(x, y)=\alpha g-\lambda g$ with proof $\pi_{add}$ (the proof will use the commitments to ag, i.e., ($a_2$, $a_3$) and to λg, i.e., ($C_2$,$C_3$)). It also computes $z_2=\beta_1 r$. It transmits ($z_1$, $z_2$, $\pi_{add}$) to the verifier. The verifier then verifies proof $\pi_{add}$ and checks that $z_1P+z_2Q+C_1=a_1$. After performing the proof of correct exponentiation, a proof of addition is performed to show that tR−r^−1 zG=Q.

After proving knowledge of a valid ECDSA signature with respect to the committed public key, the second stage proves that the committed public key Q belongs to a larger anonymity set containing many more public keys. In an embodiment, RSA accumulators are used to prove that the committed public key Q belongs to a larger anonymity set containing many more public keys. An RSA accumulator has the benefit of its constant proof size irrespective of the cardinality of the set. However, we also note that a potential downside with RSA accumulators is that witnesses to membership are invalidated when new additions are made to the set.

If an RSA accumulator approach is used, an accumulator composite statement proof is used to construct a proof of the form x∈S & P(x; w, t) for a committed set S in an RSA accumulator and a proposition P(x; w, t). In an embodiment, x is a Pedersen hash of a public key, and t is the hash of the message, with P and w described piecemeal as follows. A Pedersen hash is a secure hash function that maps a sequence of bits to a compressed point on an elliptic curve. RSA accumulators can only use prime entries. Therefore, a hash function is used to map arbitrary elements to primes which are then stored in the accumulators. While several choices of hash functions exist, in some embodiments a Pedersen hash is used because it simplifies the proofs by allowing reuse of machinery already used (e.g., double discrete log proofs). In particular, the public key Q is not directly inserted into the accumulator, but a Pedersen hash of the x-coordinate of Q together with an auxiliary value j is inserted into the accumulator. The variable j is chosen such that the output of hash is a prime. In fact, we use an OR proof for the first bit of the x-coordinate, to save on double discrete log proofs. This Pedersen hash is turned into a bit expansion and truncated to the correct range, and that is how x is obtained.

Because the proof of double discrete logarithm requires a commitment in E, and results in a value committed in the Tom curve, it is necessary to transfer the commitment back to P-256 from the Tom curve. Since the orders are not the same (like in the case of P-256), this means committing to a binary expansion ($x_0$, $x_1$, . . . , $x_{255}$), proving the binary expansion is in fact binary and commits to the same values as a second set ($y_0$, $y_1$, . . . $y_{255}$) and then rearranging the bits to ensure no overflow. We treat $y_{255}$ separately: letting $y_{low}$ be the value of all the low bits and keeping $y_{255}$ separate we compute $g^{y}{}_{255}$ $h_1^{y_{low}} h_2^{j}$ as the Pedersen hash. The j is an auxiliary value used to ensure the result, after having its high bit set, is prime. A commitment to this value is then input into the proofs that link the RSA accumulator to the rest of the statement.

Although an RSA accumulator approach has been described, in an embodiment a Groth-Kohlweiss proof can be used instead. Once there is a commitment to the public key G, a Groth-Kohlweiss proof can be used to demonstrate that the commitment to the x-coordinate opens to some entry on a list of values. Unlike an RSA accumulator, this has logarithmic size in the number of keys, rather that constant size. It does, however, avoid a considerable number of auxiliary proofs in the computation of the Pedersen hash, leading to faster and smaller proofs.

In some embodiments the zero-knowledge proof is a Succinct Noninteractive Argument of Knowledge (SNARK), or any other zero knowledge proof system. In some embodiments the proof proves both membership of the committed key on the list and knowledge of a signature with the same method, while in others different techniques may be used for each proof.

In some embodiments, the proof verification is accelerated as compared to conventional techniques. Conventionally, verifying a proof includes the verifier recomputing the commitments from the response, then hashing them to verify the challenge. In some embodiments herein, the commitments and the responses are transmitted to the verifier (e.g., the compute server 120) and the verifier computes multiexponentiations that evaluate to the identity. Then these equations can be multiplied by different random values and evaluated all together. For example, if the prover has transmitted points U and V and the verifier has values s and t and it is claimed that s*G+t*H=U and t*G+s*H=V, the verifier picks two random values r1 and r2, and computes a1=r1*s+r2*t, a2=r2*t+r1*s, then checks that a1*G+a2*H−r1*U−r2*V evaluates to the identity.

In some embodiments the verifier accelerates verification by only examining a randomly selected subset of relations for correctness. The probability of inadvertently accepting an incorrect proof decreases exponentially with the number of relations examined.

Figure 4:
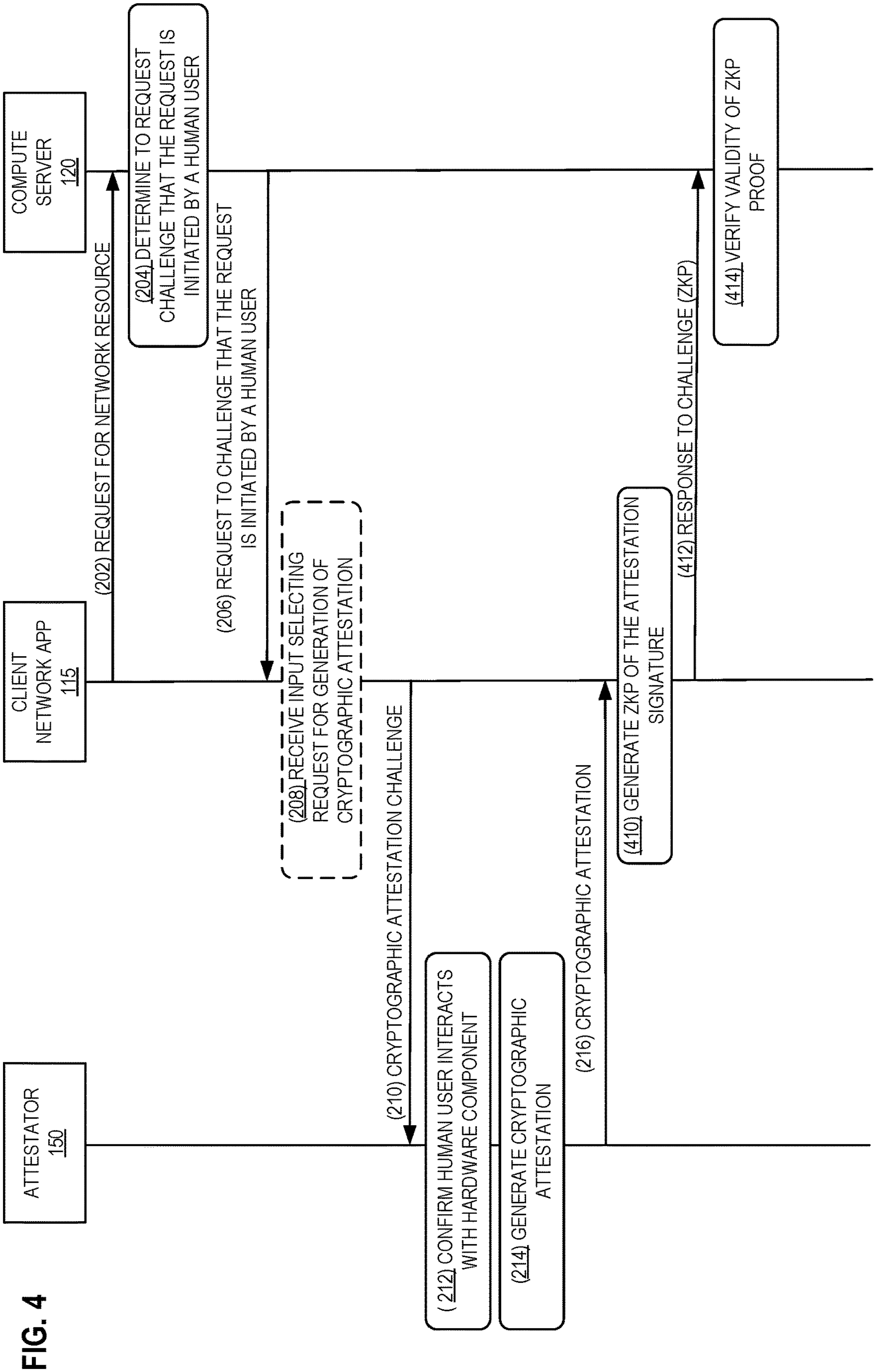
FIG. 4 is a sequence diagram that illustrates exemplary operations for proving that traffic received from a client device is initiated by a human based on a cryptographic attestation that is verified using zero-knowledge proofs, according to an embodiment.

FIG. 4 is a sequence diagram that illustrates exemplary operations for proving that traffic received from a client device is initiated by a human based on a cryptographic attestation that is verified using zero-knowledge proofs, according to an embodiment. FIG. 4 includes the operations 204-216 that are performed in a like manner as described with respect to FIG. 2A. Thus, a cryptographic attestation has been generated by the attestator 150 with an attestation that contains a digital signature. In some embodiments, the digital signature is an ECDSA signature. Unlike the embodiment described in FIGS. 2A-2B, the compute server 120 does not verify the validity of the attestation itself using the attestation public key. Instead, the client network application 115 and the compute server 120 use a zero-knowledge proof to prove the validity of the attestation without revealing the public key that could be used to verify the attestation.

At operation 410, the client network application 115 extracts the attestation signature and generates a zero-knowledge proof (ZKP) that demonstrates the client network application 115 has knowledge of the attestation signature under a committed public key and that the committed public key belongs to a larger anonymity set including many more public keys (e.g., the public key is in an accumulator sent by the server or on a publicly available list). Generating the ZKP can be done as previously described. At operation 412, the client network application 115 transmits a response to the challenge request to the compute server 120. The response to the challenge may include the ZKP, the scalar R, and the challenge. The ZKP may be serialized (e.g., converted to JSON or other serialization). In some embodiments, the response does not include the attestation signature and/or the public key or certificate chain. In embodiments where the WebAuthn standard is used, the response may be sent in an AuthenticatorAttestationResponse message where the attestationObject contains ZKP proof and the scalar R (e.g., instead of the attestation signature and the credential data) and the challenge may be sent in client data.

After receiving the response, the compute server 120 verifies the validity of the ZKP proof at operation 414. To verify, the server verifies each of the proofs included in the response from the client. Each verification involves hashing the commitments made by the prover, using the hash to compute a challenge value, and then examining the correctness of the response generated by the prover to that challenge. The examination involves computing terms involving the commitments and known base points, the response, and the challenge, and ensuring equalities between these terms hold. Such equalities may be computed and verified simultaneously. By way of example, the proofs include an addition of committed values or proofs of products of committed values. If verified, then operation moves to operation 222A. If not verified, then operations move to operation 222B or 222C.

In an embodiment, after verifying the validity of the ZKP proof, multiple tokens are generated that can be used to bypass future challenges. The tokens may be cryptographically blinded and sent to the compute server 120. The compute server 120 may sign the blinded tokens and return them to the client network application 115. If a subsequent challenge is detected, instead of performing the attestation and the ZKP proof, the client network application 115 can transmit a signed token to the compute server 120. The compute server 120 checks the validity of the signed token and if valid, allows the challenge to pass.

Figure 6:
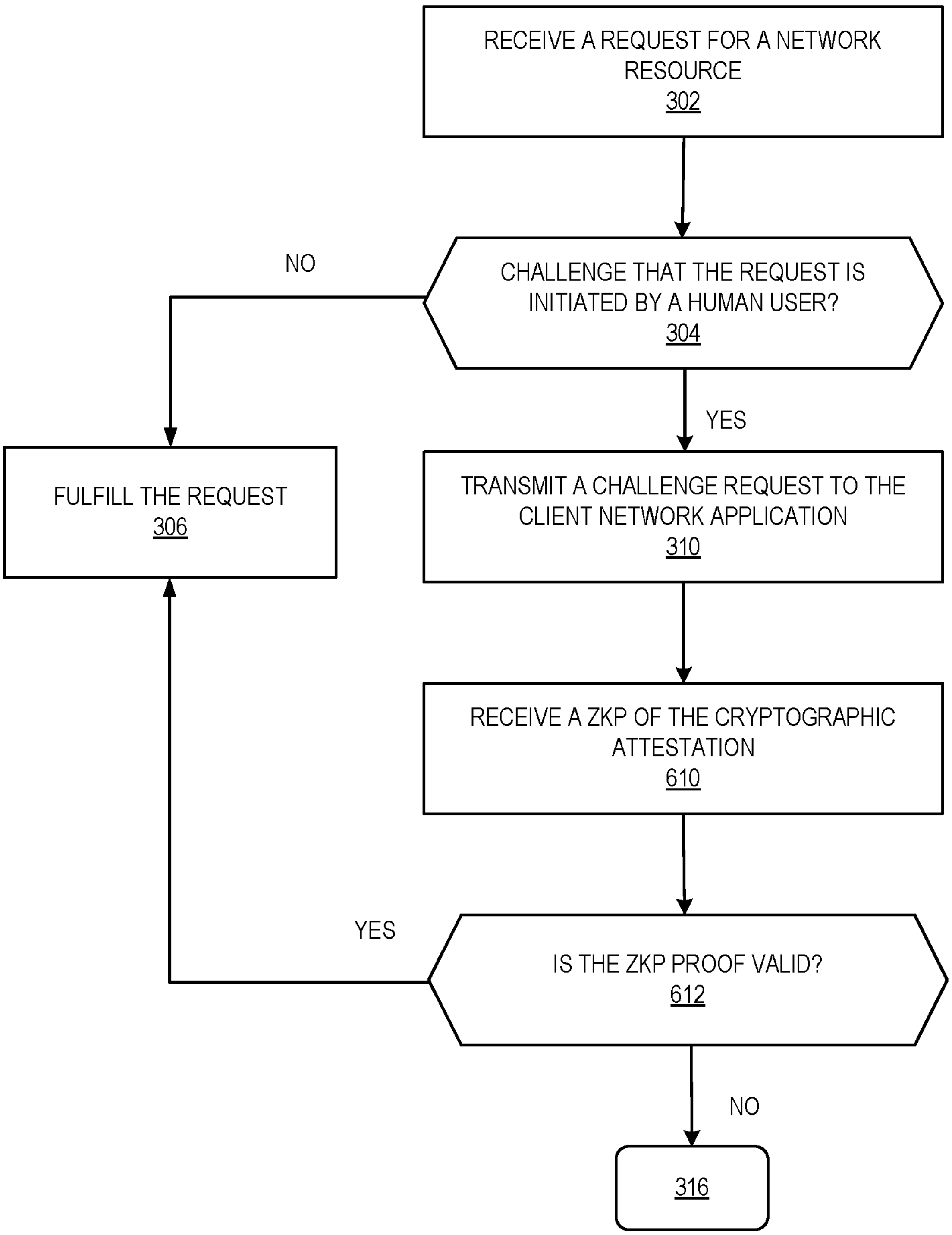
FIG. 6 illustrates a flow diagram of exemplary operations for proving that traffic received from a client device is initiated by a human based on a cryptographic attestation, according to an embodiment.

FIG. 6 illustrates a flow diagram of exemplary operations for proving that traffic received from a client device is initiated by a human based on a cryptographic attestation, according to an embodiment. The operations 302, 304, 306, and 310 are like the operations described with respect to FIG. 3A. Thus, the compute server has transmitted a challenge request to the client network application. However, unlike the embodiment described in FIG. 3A, in the embodiment of FIG. 6 the cryptographic attestation itself is not returned to the compute server 120. Instead, the client network application generates a ZKP of the attestation signature as previously described and transmits the ZKP to the compute server 120 instead of the attestation signature. Thus, at operation 610, the compute server 120 receives a response from the client network application that includes a ZKP of the attestation signature and may include the challenge, and the scalar R. Next, at operation 612, the compute server 120 determines the validity of the ZKP proof. If the compute server 120 determines that the ZKP proof is valid, then operation 306 is performed. If the compute server 120 determines that the ZKP proof is not valid, then operation 316 is performed.

In an embodiment where the client network application may be issued one or more tokens upon successfully completing a challenge, instead of the compute server 120 receiving a ZKP at operation 610, the compute server 120 may receive a signed token. The compute server then determines whether the signed token is valid instead of performing operation 612. If the signed token is valid, then operation 306 is performed. If the signed token is not valid, then operation 316 would be performed.

Embodiments described herein perform arithmetic operations in the client network application (e.g., the browser itself). Client network applications may only support a limited number of operations and not arbitrary elliptic curve arithmetic. This causes all operations to be inherently variable-time. Also, the only way to implement arithmetic modulo p is via frequent reductions. Montgomery form is not available. Also, there is no access to the limbs of a number, which converts iteration over bits into a modulus operation and division. Many other operations like modular inversion can only be implemented in naive ways making them inherently more expensive than otherwise. If the native representation of a big number as an array of 64-bit words via the Typed Arrays facility was exposed and converted from such arrays to BigInts, would solve the problem of bitwise access and permit writing any missing functions that were required with maximum efficiency through WebAssembly (for example) if WebAssembly was extended with a few more arithmetic instructions. Also, the operations can be enhanced if modular exponentiation and the extended Euclidean algorithm was provided to be executed by the client network application. It may be possible to enhance the operations if BigInts of specified lengths and an operation that performs a Montgomery reduction and a Montgomery reduction interleaved with multiplication is natively supported. This would improve some of the variable time issues and would provide more efficient multiplication and reduction.

Figure 7:
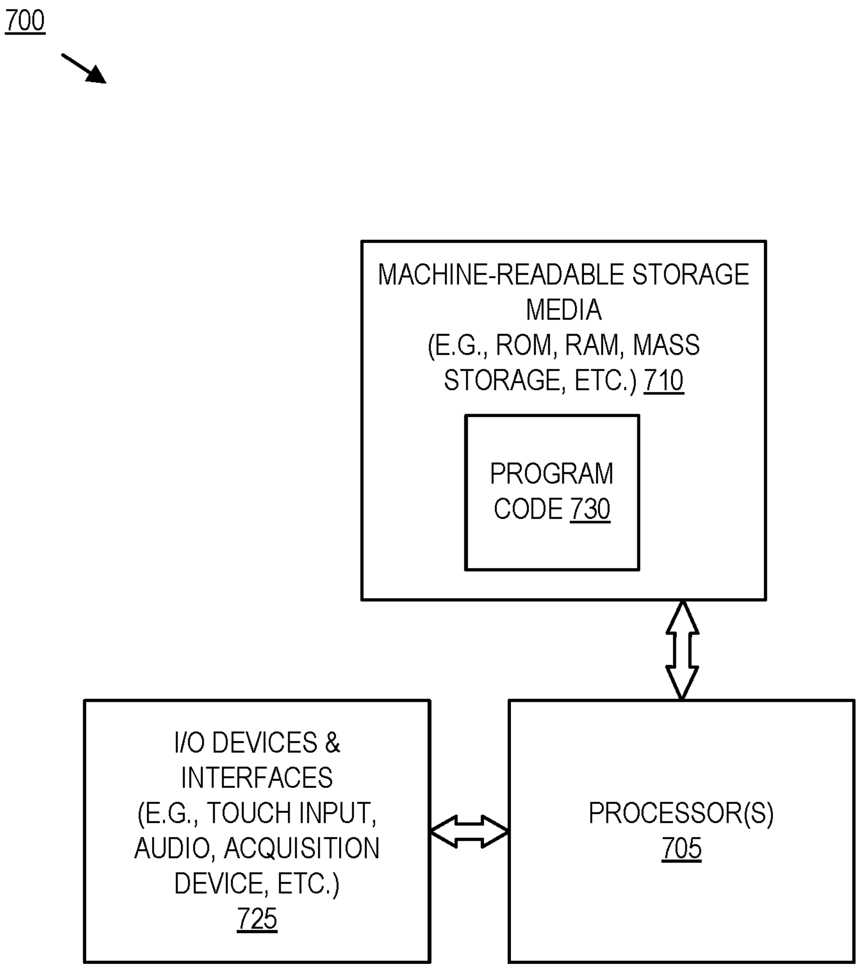
FIG. 7 illustrates a block diagram for an exemplary data processing system that may be used in some embodiments.

FIG. 7 illustrates a block diagram for an exemplary data processing system 700 that may be used in some embodiments. One or more such data processing systems 700 may be utilized to implement the embodiments and operations described with respect to the client device 110, the compute server 120, the origin server(s) 130, and/or the attestation system 140.

The data processing system 700 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 720. The processing system 720 may be one or more processors and/or connected system components such as multiple connected chips. The depicted machine-readable storage media 710 may store program code 730 that, when executed by the processor(s) 720, causes the data processing system 700 to perform the operations described herein.

The data processing system 700 may also include one or more network interfaces (e.g., a wired and/or wireless interfaces) that allows the data processing system 700 to transmit data and receive data from other computing devices, typically across one or more networks (e.g., Local Area Networks (LANs), the Internet, etc.). The data processing system 700 may also include one or more input or output ("I/O") components 725 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 700, and, in certain embodiments, fewer components than that shown may be part of the system 700.

In the preceding description, numerous specific details are set forth to provide a more thorough understanding. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:

transmitting, from a client network application of a client device, a first request for a first network resource to a server;

receiving, from the server, a second request to challenge that the first request was initiated by a human user through verifying a first physical interaction between the human user and a hardware component, the second request being received prior to the first network resource being received at the client network application;

causing a first prompt to be displayed to perform the first physical interaction with the hardware component;

receiving a first cryptographic attestation that includes a first attestation signature that is generated after confirmation that the first physical interaction was performed with the hardware component;

generating a first zero-knowledge proof of the first attestation signature at the client device;

transmitting, from the client network application to the server, the first zero-knowledge proof of the first attestation signature for verification;

receiving the first network resource responsive to the server verifying the validity of the first zero-knowledge proof of the first attestation signature;

transmitting, from the client network application of the client device, a third request for a second network resource to the server;

receiving, from the server, a fourth request to challenge that the third request was initiated by a human user through verifying a second physical interaction between the human user and the hardware component, the third request being received prior to the second network resource being received at the client network application;

causing a second prompt to be displayed to perform the second physical interaction with the hardware component;

receiving a second cryptographic attestation that includes a second attestation signature that is generated after confirmation that the second physical interaction was performed with the hardware component;

generating a second zero-knowledge proof of the second attestation signature at the client device;

transmitting, from the client network application to the server, the second zero-knowledge proof of the second attestation signature for verification;

receiving a request for the human user to participate in a CAPTCHA challenge responsive to the server determining that the second zero-knowledge proof cannot be verified as valid;

presenting the CAPTCHA challenge;

transmitting, from the client network application to the server, a response to the CAPTCHA challenge; and receiving the second network resource responsive to the server verifying the response to the CAPTCHA challenge.

2. The method of claim 1, wherein the first cryptographic attestation is generated by an attestation system that is coupled with the client device.

3. The method of claim 2, wherein the first cryptographic attestation is implemented by a hardware security key that is adapted to receive a capacitive touch as the first physical interaction.

4. The method of claim 2, wherein the first attestation signature is generated using an internal secret key of the attestation system.

5. The method of claim 1, wherein generating the first zero-knowledge proof proves that the client device has knowledge of the first attestation signature for a public key that is on a server-provided list of a plurality of public keys without revealing which one of the plurality of public keys is the public key.

6. The method of claim 5, wherein the server-provided list of the plurality of public keys is maintained in a least-recently used (LRU) order.

7. A method, comprising:

receiving, from a first client network application, a first request for a network resource;

determining that verification that the first request is initiated by a first human user is to be performed;
transmitting to the first client network application a second request to challenge that the first human user initiated the first request, the second request being transmitted prior to fulfilling the first request;
receiving, from the first client network application in response to the second request to challenge, a first zero-knowledge proof of a first attestation signature to attest that the first human user has performed a first physical interaction;
verifying validity of the first zero-knowledge proof;
fulfilling the first request responsive to verifying validity of the first zero-knowledge proof;
receiving from a second client network application, a third request for the network resource;
determining that verification that the third request is initiated by a second human user is to be performed;
transmitting to the second client network application a fourth request to challenge that the second human user initiated the third request;
receiving, from the second client network application in response to the fourth request to challenge, a second zero-knowledge proof of a second attestation signature to attest that the second human user has performed a second physical interaction;
determining that the second zero-knowledge proof cannot be verified as valid; and
responsive to determining that the second zero-knowledge proof cannot be verified as valid, transmitting to the second client network application a fifth request for the second human user to participate in a CAPTCHA challenge before fulfilling the third request.

8. The method of claim 7, wherein determining that verification that the first request is initiated by the first human user includes determining that a domain of first network resource is subject to a denial-of-service attack.

9. The method of claim 7, wherein determining that verification that the first request is initiated by the first human user includes determining that a verification configuration setting is enabled and applicable for the network resource.

10. The method of claim 7, wherein the determining that verification that the first request is initiated by the first human user includes determining a threat score associated with the first client network application indicates it is likely the first request is from a bot.

11. The method of claim 7, further comprising performing a rate limiting based on IP addresses included in messages including zero-knowledge proofs.

12. The method of claim 7, wherein verifying the validity of the first zero-knowledge proof proves that the first client network application has knowledge of the first attestation signature for a public key that is on a server-provided list of a plurality of public keys without revealing which one of the plurality of public keys is the public key.

13. The method of claim 12, wherein the server-provided list of the plurality of public keys is maintained in a least-recently used (LRU) order.

14. A client device, comprising:
a processor; and
a non-transitory machine-readable storage medium that provides instructions that, when executed by the processor, will cause the client device to perform operations comprising:
transmitting, from a client network application of the client device, a first request for a first network resource to a server;
receiving, from the server, a second request to challenge that the first request was initiated by a human user through verifying a first physical interaction between the human user and a hardware component, the second request being received prior to the first network resource being received at the client network application;
causing a first prompt to be displayed to perform the first physical interaction with the hardware component;
receiving a first cryptographic attestation that includes a first attestation signature that is generated after confirmation that the first physical interaction was performed with the hardware component;
generating a first zero-knowledge proof of the first attestation signature at the client device;
transmitting, from the client network application to the server, the first zero-knowledge proof of the first attestation signature for verification; and
receiving the first network resource responsive to the server verifying the validity of the first zero-knowledge proof of the first attestation signature;
transmitting, from the client network application of the client device, a third request for a second network resource to the server;
receiving, from the server, a fourth request to challenge that the third request was initiated by a human user through verifying a second physical interaction between the human user and the hardware component, the third request being received prior to the second network resource being received at the client network application;
causing a second prompt to be displayed to perform the second physical interaction with the hardware component;
receiving a second cryptographic attestation that includes a second attestation signature that is generated after confirmation that the second physical interaction was performed with the hardware component;
generating a second zero-knowledge proof of the second attestation signature at the client device;
transmitting, from the client network application to the server, the second zero-knowledge proof of the second attestation signature for verification;
receiving a request for the human user to participate in a CAPTCHA challenge responsive to the server determining that the second zero-knowledge proof cannot be verified as valid;
presenting the CAPTCHA challenge;
transmitting, from the client network application to the server, a response to the CAPTCHA challenge; and
receiving the second network resource responsive to the server verifying the response to the CAPTCHA challenge.

15. The client device of claim 14, wherein the client device receives the first cryptographic attestation from an attestation system coupled with the client device.

16. The client device of claim 15, wherein the first cryptographic attestation is implemented by a hardware security key that is adapted to receive a capacitive touch as the first physical interaction.

17. The client device of claim 15, wherein the first attestation signature is generated using an internal secret key of the attestation system.

18. The client device of claim 14, wherein generating the first zero-knowledge proof proves that the client device has knowledge of the first attestation signature for a public key that is on a server-provided list of a plurality of public keys without revealing which one of the plurality of public keys is the public key.

19. The client device of claim 18, wherein the server-provided list of the plurality of public keys is maintained in a least-recently used (LRU) order.

20. A server, comprising:

a processor; and a non-transitory machine-readable storage medium that provides instructions that, when executed by the processor, will cause the server to perform operations comprising:

receiving, from a first client network application, a first request for a network resource;

determining that verification that the first request is initiated by a first human user is to be performed;

transmitting to the first client network application a second request to challenge that the first human user initiated the first request, the second request being transmitted prior to fulfilling the first request;

receiving, from the first client network application in response to the second request to challenge, a first zero-knowledge proof of a first attestation signature to attest that a human user has performed a first physical interaction;

verifying validity of the first zero-knowledge proof;

fulfilling the first request responsive to verifying validity of the first zero-knowledge proof;

receiving from a second client network application, a third request for the network resource;

determining that verification that the third request is initiated by a second human user is to be performed;

transmitting to the second client network application a fourth request to challenge that the second human user initiated the third request;

receiving, from the second client network application in response to the fourth request to challenge, a second zero-knowledge proof of a second attestation signature to attest that the second human user has performed a second physical interaction;

determining that the second zero-knowledge proof cannot be verified as valid; and responsive to determining that the second zero-knowledge proof cannot be verified as valid, transmitting to the second client network application a fifth request for the second human user to participate in a CAPTCHA challenge before fulfilling the third request.

21. The server of claim 20, wherein determining that verification that the first request is initiated by the first human user includes determining that a domain of the network resource is subject to a denial-of-service attack.

22. The server of claim 20, wherein determining that verification that the first request is initiated by the first human user includes determining that a verification configuration setting is enabled and applicable for the network resource.

23. The server of claim 20, wherein the determining that verification that the first request is initiated by the first human user includes determining a threat score associated with the first client network application indicates it is likely the first request is from a bot.

24. The server of claim 20, further comprising performing a rate limiting based on IP addresses included in messages including zero-knowledge proofs.

25. The server of claim 20, wherein verifying the validity of the first zero-knowledge proof proves that the first client network application has knowledge of the first attestation signature for a public key that is on a server-provided list of a plurality of public keys without revealing which one of the plurality of public keys is the public key.

26. The server of claim 25, wherein the server-provided list of the plurality of public keys is maintained in a least-recently used (LRU) order.

* * * * *